Figure 1:
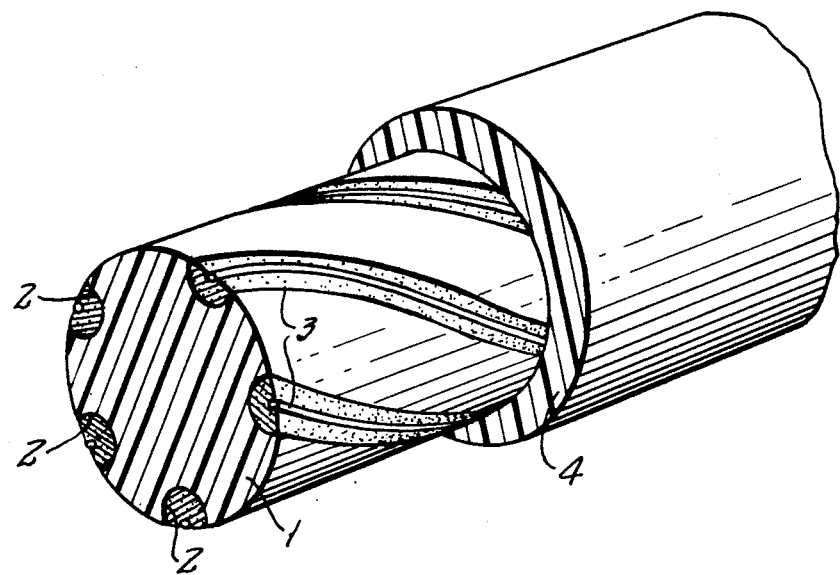

United States Patent [19]

Pasini et al.

[11] Patent Number: 4,688,889

[45] Date of Patent: Aug. 25, 1987

[54] HYDROGEN FIXING FILLERS FOR OPTICAL FIBER CABLES AND COMPONENTS AND CABLES AND COMPONENTS CONTAINING SUCH FILLER

[75] Inventors: Franco Pasini; Pietro Anelli, both of Milan, Italy

[73] Assignee: Societa Cavi Pirelli S.p.A., Milan, Italy

[21] Appl. No.: 798,598

[22] Filed: Nov. 15, 1985

Related U.S. Application Data

[63] Continuation-in-part of Ser. No. 723,901, Apr. 16, 1985.

[30] Foreign Application Priority Data

Nov. 23, 1984 [IT] Italy .................. 23729 A/84

[51] Int. Cl.$^4$ .................. G02B 6/44; B01J 31/00
[52] U.S. Cl. .................. 350/96.23; 350/96.34; 502/159; 502/402
[58] Field of Search .................. 502/158, 159, 161, 169, 502/401, 402; 350/96, 23, 96.34

[56] References Cited

U.S. PATENT DOCUMENTS

| | | | |
|---|---|---|---|
| 4,036,944 | 7/1977 | Blytas | 502/402 X |
| 4,080,490 | 3/1978 | Dawans et al. | 502/159 X |
| 4,110,425 | 8/1978 | Bühl et al. | 502/159 X |
| 4,235,748 | 11/1980 | Berchielli et al. | 502/159 X |
| 4,433,063 | 2/1984 | Bernstein et al. | 502/402 |
| 4,481,303 | 11/1984 | McIntyre et al. | 502/159 |
| 4,528,281 | 7/1985 | Sutt, Jr. | 502/402 |

*Primary Examiner*—William L. Sikes
*Assistant Examiner*—Frank González
*Attorney, Agent, or Firm*—Brooks, Haidt, Haffner & Delahunty

[57] ABSTRACT

A hydrogen fixing filler for optical fiber cables and components of such cables and optical fiber cables and cable components containing such filler with the filler at least partly surrounding, but not necessarily in contact with, the optical fiber or fibers. The filler is a mixture of:

(1) at least one unsaturated silicone, having unsaturated groups in quantities larger than 0.2 millimoles per 100 g. of silicone and corresponding to the formula:

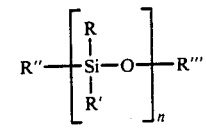

where R and R' are saturated or unsaturated aliphatic radicals and aromatic radicals and R" and R''' are unsaturated aliphatic radicals, and (2) a catalyst which is one or more of the transition metals, the inorganic and organometallic salts of the transition metals and the organometallic acids of the transition metals, either alone or on inert supports.

20 Claims, 2 Drawing Figures

HYDROGEN FIXING FILLERS FOR OPTICAL FIBER CABLES AND COMPONENTS AND CABLES AND COMPONENTS CONTAINING SUCH FILLER

This application is a continuation-in-part of co-pending application Ser. No. 723,901 filed Apr. 16, 1985, entitled "Optical Fiber and Cable with Hydrogen Combining Layer" and assigned to the assignee of this application.

The present invention relates to a filler for optical fiber cables and their components and to optical fiber cables and to components of optical fiber cables containing said filler.

With optical fiber cables there is the problem of preventing the optical fibers from absorbing gaseous hydrogen so as to avoid certain drawbacks, such as, for example, the attenuation of the signals transmitted at wave lengths greater than 1 micron, i.e. an attenuation at the wave lengths used in the telecommunications, and the degradation of the mechanical characteristics of the optical fibers.

The hydrogen which can reach the optical fibers of a cable comes both from the ambient outside the cable, owing to its diffusion through the cable components, and from inside the cable by emission of hydrogen from the materials forming the cable when said materials have absorbed hydrogen during their manufacturing processes or by decomposition of some of the materials used to form the cable.

In fact, hydrogen can develop from the metallic or plastic sheaths of the cables, from the plastic cores of the cables, from the metallic armors of the cables and from the protective means for the optical fibers constituted, for example, by tubes in which the fibers are loosely housed.

Hydrogen can also form in consequence of chemical reactions occurring among the cable materials with traces of water either in liquid state or in the form of vapor which may penetrate into the cables.

An object of the present invention is that of providing a barrier in the optical fiber cables which is able to chemically block the hydrogen and prevent it from reaching the optical fibers.

In accordance with one object of the present invention, there is provided a filler for optical fiber cables and their components which comprises a mixture of:

(1) at least one unsaturated silicone, having unsaturated groups in quantities larger than 0.2 millimoles per 100 g. of silicone and corresponding to the formula:

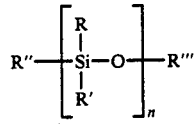

where R and R' are saturated or unsaturated aliphatic radicals and aromatic radicals and R" and R'" are unsaturated aliphatic radicals, and (2) a catalyst which is one or more of the transition metals, the inorganic and organometallic salts of the transition metals and the organometallic acids of the transition metals, either alone or on inert supports.

A further object of the present invention is to provide an optical fiber cable comprising a sheath and an optical core housing one or more optical fibers, characterized by the fact that the fibers are surrounded by a mixture comprising:

(a) at least one unsaturated silicone, having unsaturated groups in quantities larger than 0.2 millimoles per 100 g. of silicone and corresponding to the formula:

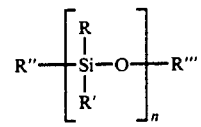

(b) a catalyst which is one or more of the transition metals, the inorganic and organometallic salts of the transition metals, the organometallic acids of the transition metals, either alone or on inert supports.

A still further object of the present invention is to provide components for optical fiber cables in the form of a tube in which at least one optical fiber is loosely housed, characterized by the fact that said tube is filled with a mixture comprising:

A. at least one unsaturated silicone having unsaturated groups in quantities larger than 0.2 millimoles per 100 g. of silicone and corresponding to the formula:

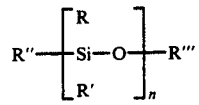

where R and R' are saturated or unsaturated aliphatic radicals and aromatic radicals and R" and R'" are unsaturated aliphatic radicals, and B. a catalyst which is one or more of the transition metals, the inorganic and organometallic salts of the transition metals, the organometallic acids of the transition metals, either alone or on inert supports.

Figure 2:
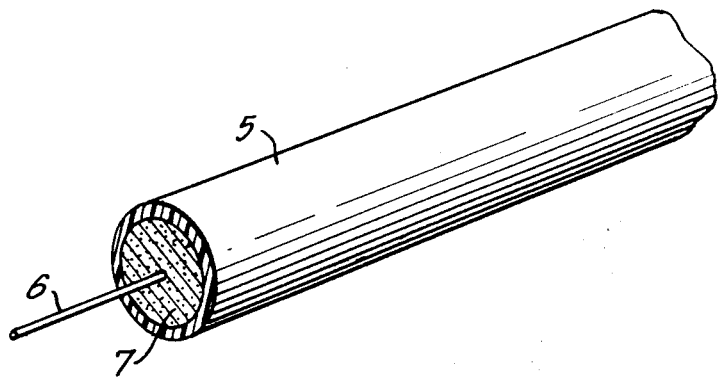

Other objects and advantages of the present invention will be apparent from the following detailed description of the presently preferred embodiments thereof, which description should be considered in conjunction with the accompanying drawings in which:

FIG. 1 is a perspective view of an optical fiber cable according to the invention with portions of parts removed in order to illustrate more clearly the structure; and FIG. 2 is a perspective view of a portion of an optical fiber cable component according to the present invention.

According to the present invention, protection against the absorption of hydrogen by the cable optical fibers is obtained by means of a filler which is able to chemically fix hydrogen and thereby prevent the hydrogen from reaching the optical fibers. The filler of the invention is constituted by a mixture, the two essential components of which are set forth hereinafter.

An essential component of the filler mixture is an unsaturated silicone having unsaturated groups in quantities larger than 0.2 millimoles per 100 g. of silicone and preferably between 2 and 100 millimoles per 100 g. of silicone.

The silicone corresponds to the following chemical formula:

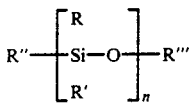

where R and R' are saturated or unsaturated aliphatic radicals and aromatic radicals, R" and R'" are unsaturated aliphatic radicals and n is any integral number and preferably is an integral number comprised between 100 and 2000.

In particular R and R', which can be the same or different, are radicals selected, by way of example, among

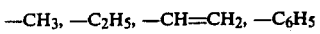

and R" and R'", which are the same or different, are radicals selected, by way of example, among

In particular, one of the silicones which may be used for the mixture according to the invention can be a vinyl-terminated polydimethylsiloxane devoid of any unsaturation elsewhere in the chain and corresponding to the following formula:

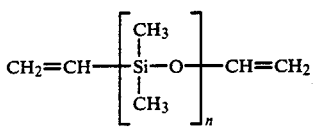

Another particular silicone compound which may be used for the mixture according to the present invention can be a vinyl-terminated polydimethylsiloxane with vinyl unsaturations also in the chain corresponding to the following formula:

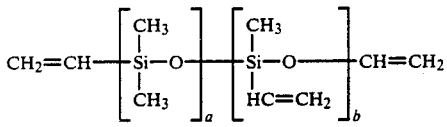

in which a and b are integral numbers the sum of which is n, and the respective values of which can be determined by those skilled in the art once the value of n and the content of unsaturated groups are given.

The other essential component of the mixture according to the invention is constituted by one or more hydrogenation catalysts selected among the transition metals, the inorganic and organometallic salts of the transition metals and the organometallic acids of the transition metals. Said catalysts can be used as they are or, in the alternative, be supported by inert materials.

Examples of suitable catalysts are powdered platinum, powdered palladium, powdered nickel, organic or organometallic salts of said metals, iron pentacarbonyl and chloroplatinic acid, either alone or supported on inert materials having a large specific surface, such as, for example, animal or vegetable carbon, known in the art as "charcoal".

A mixture according to the present invention can comprise in addition to the two above indicated essential components, some additives in the event that it is necessary to provide a mixture with viscosity values which will permit the introduction of the mixture into optical fiber cables having configurations which require such viscosities. However, it is important that when additives are present in the mixture, this mixture still has to be able to chemically block, within an optical fiber cable, all the hydrogen which can reach said optical fibers.

In an optical fiber cable, the quantity of hydrogen which can form or penetrate from outside varies according to the cable structure, the materials forming the components of the cable structure and the characteristics of the ambient where the cable must work.

Those skilled in the art are able to determine the quantity of hydrogen which can reach the optical fibers for each cable and cable installation. Once this quantity has been determined, it is possible to define, for each possible mixture according to the present invention, the minimum quantity of unsaturated silicone on the basis of the fact that in said mixture each millimole of unsaturated groups chemically blocks a millimole of hydrogen.

Two specific embodiments of a filler for optical fiber cables and their components according to the present invention are set forth hereinafter only by way of example.

EXAMPLE 1

The filler according to this example has the following composition:
  Vinyl-terminated polydimethylsiloxane, devoid of unsaturations in its chain and the formula of which has been previously set forth, wherein n is 360 and and the content of unsaturated groups is 7.4 millimoles in 100 g. of silicone—90 g.
  Powdered palladium with granules having average dimensions of 48 microns—0.2 g.
  Colloidal silica (additive)—10 g.

This filler has been prepared by mixing the above-indicated vinyl-terminated polydimethylsiloxane, with the powdered palladium constituting the catalyst and adding subsequently the colloidal silica additive.

Although the filler set forth in Example 1 comprises colloidal silica additive, the additive may be omitted and still provide a filler according to the invention.

Experimental tests have been carried out with the filler of the Example 1 in order to determine its capacity of absorb hydrogen, and such experimental tests were carried out as follows:

The apparatus used comprised a glass bulb of 175 cm$^3$ capacity tightly connected to a small glass tube ending into a two-way cock, one way being connected to a vacuum pump and the other, to a phial containing hydrogen. A mercury gauge is inserted at an intermediate position on the small tube.

The glass bulb walls were covered with 15 g. of the filler of Example 1 and subsequently, using the vacuum pump, barometric vacuum was effected, the obtaining of this vacuum being indicated by the mercury gauge.

At this stage, the pumping was discontinued and the glass bulb was put into communication with the phial containing hydrogen so that the hydrogen can flow into the glass bulb and contact and chemically react with the filler present in said glass bulb.

The tests were carried out at a temperature of 20° C. with the introduction into the glass bulb of a predetermined quantity of hydrogen measured on the basis of the pressure of the hydrogen in the glass bulb and by detecting the reduction of the pressure in the glass bulb which takes place with the passing of time so as to determine the asymptotic value for said pressure.

On the basis of such data, it has been possible to determine the hydrogen quantities reacted with the filler, and in particular, the maximum reacted hydrogen quantity and the time taken for the maximum to be reached, i.e. the reaching of the asymptotic value.

Two experimental tests were carried out with different starting quantities of hydrogen introduced into the glass bulb. The first experimental test was carried out with the introduction into the glass bulb of hydrogen at a pressure of 760 mm of mercury corresponding to a quantity of $1.45 \times 10^{-2}$ g. of hydrogen.

After 48 hours, the hydrogen pressure was reduced to 676 mm of mercury corresponding to a chemical absorption by the filler of $1 \times 10^{-2}$ g. of hydrogen per 100 g. of filler.

After 100 hours, the hydrogen pressure had practically reached the asymptotic value of 655 mm of mercury corresponding to $1.34 \times 10^{-2}$ g. of hydrogen chemically absorbed per 100 g. of filler which is the maximum quantity of hydrogen that the filler is able to chemically absorb.

A second experimental test was carried out by introducing hydrogen into the glass bulb at a pressure of 200 mm of mercury corresponding to a quantity of $0.38 \times 10^{-2}$ g. of hydrogen.

After 48 hours, the hydrogen pressure was reduced to 130 mm of mercury corresponding to a chemical absorption of $0.89 \times 10^{-2}$ g. of hydrogen per 100 g. of filler.

After 100 hours, the hydrogen pressure had practically reached the asymptotic value of 95 mm of mercury corresponding to $1.34 \times 10^{-2}$ g. of hydrogen reacted per 100 g. of filler which is the same maximum quantity of hydrogen chemically reacted with the filler obtained with the first test.

EXAMPLE 2

The filler according to this example has the following composition:
Vinyl-terminated polydimethylsiloxane with vinyl unsaturations also in the chain and the chemical formula of which has been previously set forth, wherein the value n, equal to the sum of a and b, is 1500 and the content in unsaturated groups is of 17 millimoles in 100 g. of silicone—100 g.
Palladium supported on vegetable charcoal in the concentration of 7 g. of palladium per 100 g. of vegetable charcoal—0.6 g.

An experimental test was carried out with the filler of Example 2 in order to determine its capacity to absorb hydrogen by means of the same apparatus previously described as used in testing the filler of Example 1. The only difference was that the glass bulb walls were covered with 3.5 g. of the filler of the Example 2.

In order to carry out the experimental test, hydrogen at a pressure of 760 mm of mercury corresponding to a quantity of $1.45 \times 10^{-2}$ g. of hydrogen was introduced into the glass bulb.

After 48 hours, the hydrogen pressure was reduced to 686 mm of mercury corresponding to a chemical absorption by the filler of $2.7 \times 10^{-2}$ g. of hydrogen per 100 g. of filler.

After 100 hours, the hydrogen pressure had practically reached the asymptotic value of 672 mm of mercury corresponding to $3.2 \times 10^{-2}$ g. of hydrogen chemically absorbed per 100 g. of filler.

The results of such experimental tests, made at room temperature with the fillers of the Examples, show that both the maximum quantity of hydrogen which can be absorbed chemically by the filler and the time for reaching this maximum quantity do not depend on the quantity and the pressure of the hydrogen introduced into the glass bulb at the beginning. This means that the speed of the chemical reaction between the hydrogen and the filler does not depend on said quantities.

By reason of the foregoing, it can be deduced that a filler according to the present invention also is able to react effectively with traces of hydrogen.

In order to ascertain this, a further experimental test was carried out for both of the fillers of the two Examples by introducing hydrogen into the glass bulb at a pressure of 1.3 mm of mercury corresponding to $2.5 \times 10^{-5}$ g. of hydrogen. Under these conditions, it was observed that after 100 hours, the pressure in the glass bulb was reduced to zero with either filler. This value corresponds to the total absorption of hydrogen introduced into the bulb.

Accordingly, when a filler according to the invention is introduced into an optical fiber cable, the filler is an effective barrier with respect to hydrogen.

As previously said, the present invention includes, in addition to the filler, optical fiber cables and optical fiber cable components containing said filler.

An example of an optical fiber cable of the invention is shown in an optical fiber cable constructed according to the invention. The cable illustrated in FIG. 1 is merely an illustration of one type of optical fiber cable with which the filler of the invention may be used since it will be apparent to those skilled in the art that the filler may be incorporated in optical fiber cables of other types.

As shown in FIG. 1, the cable is provided with a core 1 of plastic material having a plurality of helical grooves 2 in which the optical fibers 3 are loosely received. The grooves 2 in which the optical fibers 3 are received are filled with a filler mixture of the present invention.

A sheath 4, which closes the grooves 2 at their outsides, is arranged around the core 1 of the cable.

As shown in FIG. 1, the optical fibers 3 in the grooves 2 of the core 1 are bare, but in the alternative, they can be provided with a protective covering either of an adherent type or of a loose type. In this latter case, the optical fibers are loosely housed within a tube not shown in FIG. 1, but the form thereof is illustrated in FIG. 2 described hereinafter. In this latter case, the tube also will be filled with a filler mixture of the invention.

The cable thus obtained contains in the grooves 2 of the core 1, a mixture according to the invention which prevents the hydrogen from reaching, and being absorbed by, the optical fibers 3.

The cable described hereinbefore and shown in FIG. 1 is only one specific embodiment of a cable according to the invention since a cable of the invention includes optical fiber cables of any structure provided that they have spaces containing a filler according to the invention. Said spaces containing the filler of the invention can be also more remote from the optical fibers or from the components housing the fibers than is shown in FIG. 1.

Moreover, in a cable according to the present invention the spaces containing the filler can surround, entirely or partially, the components housing the optical fibers on which form the optical core of the cable.

For instance, the present invention comprises cables, the optical core of which is formed by a plurality of tubes (without the filler therein) loosely housing one or more optical fibers, or which are formed by a plurality of sections, provided with grooves where the optical fibers are housed, laid-up together and enclosed within an outer sheath and where the filler is contained at least in some of the spaces existing between the tubes or among the grooves of the cores or the sapces between said elements and the outer sheath in contact with them.

FIG. 2 shows a component of an optical fiber cable within the present invention. Although described as a component, it will be apparent that such component alone can constitute an optical fiber cable.

As shown in FIG. 2, the illustrated component is constituted by a tube 5 of plastic or metallic material in which at least one optical fiber 6 is loosely housed. The tube is entirely filled with a composition 7 which is a filler according to the present invention.

From the previous description and from the following considerations, it will be understood that the objects of the invention are obtained.

The composition forming the filler for optical fiber cables which surrounds, or extends at least partly around, the fibers has among its essential components an unsaturated silicone, since this latter possesses double bonds in its own molecule, and a hydrogenation catalyst. As used herein, the term "surrounds" is intended to mean that the filler occupies space in the cable which extends at least partly around the optical fiber or fibers and/or the components containing the optical fiber or fibers, and it is not necessary that the filler contact the fiber or fibers.

When the hydrogen, whichever its source, comes into contact with the filler, a chemical reaction takes place to stably bind the hydrogen to the silicone compound at the double bonds.

As the previously described experimental tests prove, the filler of the present invention has a very high reactivity toward the hydrogen at room temperature which is the normal temperature of the places at which an optical fiber cable is used.

This means that with the use of the filler of the present invention, it is possible for the filler to absorb even traces of hydrogen thereby preventing such traces of hydrogen from reaching the optical fibers.

It is believed that the high reactivity of the mixture with respect to hydrogen is due to the fact that the unsaturated silicone used in association with the stated hydrogenation catalysts provides, at room temperature, an activation energy for the hydrogenation reaction which is so low as to permit the reaction to take place with only traces of hydrogen.

It follows that optical fiber cables and their components containing the filler, which can carry out a blocking function, have therein an effective barrier which protects the optical fibers with respect to contact with the hydrogen and with respect to the drawbacks produced by such contact with hydrogen.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A hydrogen fixing filler for optical fiber cables and their components comprising a mixture of:
   (a) at least one unsaturated silicone having unsaturated groups in quantities larger than 0.2 millimoles per 100 g. of said silicon and having the formula:

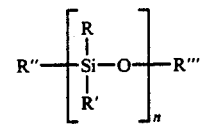

where R and R' are from the group consisting of saturated aliphatic radicals, unsaturated aliphatic radicals and aromatic radicals, R'' and R''' are unsaturated aliphatic radicals and n is an integral number; and
   (b) at least one transition metal catalyst selected from group consisting of transition metals, the inorganic and organometallic salts of the transition metals and the organometallic acids of said transition metals.

2. A hydrogen fixing filler as set forth in claim 1, wherein said transition metal catalyst is supported on an inert carrier material.

3. A hydrogen fixing filler as set forth in claim 2, wherein said carrier material is charcoal.

4. A hydrogen fixing filler as set forth in claim 1, wherein said unsaturated silicone has unsaturated groups in quantities in the range from about 2 to about 100 millimoles per 100 g. of the silicone and wherein n is an integral number in the range from about 100 to about 2000.

5. A hydrogen fixing filler as set forth in claim 1, wherein R and R' are radicals selected from the group consisting of:

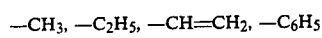

and R'' and R''' are radicals selected from the group consisting of:

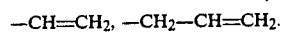

6. A hydrogen fixing filler as set forth in claim 5, wherein the unsaturated silicon is a vinyl-terminated poly-dimethylsiloxane having the formula:

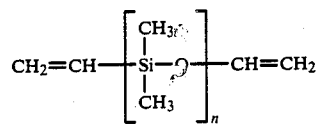

7. A hydrogen fixing filler as set forth in claim 5, wherein the unsaturated silicone is a polydimethylsiloxane terminated with vinyl unsaturations in the chain having the formula:

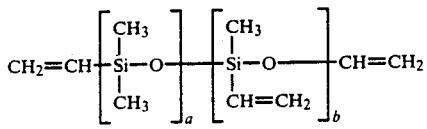

where a and b are integral numbers and their sum is equal to n.

8. A hydrogen fixing filler as set forth in claim 1, wherein the transition metal catalyst is selected from the group consisting of powdered palladium, powdered platinum, powdered nickel, iron pentacarbonyl and chloroplatinic acid.

9. A hydrogen fixing filler as set forth in claim 8, wherein said transition metal catalyst is supported on an inert carrier material.

10. An optical fiber at least partly surrounded by a mixture comprising:
 (a) an unsaturated silicone having unsaturated groups in a quantity larger than 0.2 millimoles per 100 g. of silicone and having the formula:

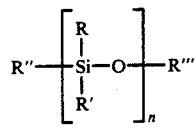

where R and R' are selected from the group consisting of saturated aliphatic radicals, unsaturated aliphatic radicals and aromatic radicals, R" and R''' are unsaturated aliphatic radicals; and n is an integral number; and
 (b) a transition metal catalyst selected from the group consisting of the transition metals, the inorganic and organometallic salts of the transition metals and the organometallic acids of the transition metals.

11. An optical fiber at least partly surrounded by a mixture as set forth in claim 10, wherein said transition metal catalyst is supported on an inert carrier material.

12. An optical fiber at least partly surrounded by a mixture as set forth in claim 10, further comprising a member having a passageway therein, said fiber being disposed in said passageway.

13. An optical fiber at least partly surrounded by a mixture as set forth in claim 12, wherein said member is a tube providing said passageway and said fiber is loosely disposed in said passageway and wherein said mixture is in said passageway between said optical fiber and the interior of the wall of said tube.

14. An optical fiber at least partly surrounded by a mixture as set forth in claim 12, wherein said member is an optical fiber cable core with said passageway therein and wherein said core is surrounded by a sheath.

15. An optical fiber at least partly surrounded by a mixture as set forth in claim 14, wherein said mixture is intermediate said sheath and said optical fiber.

16. An optical fiber at least partly surrounded by a mixture as set forth in claim 10, wherein said unsaturated silicone has unsaturated groups in quantities in the range from about 2 to about 100 millimoles per 100 g. of the silicone and wherein n is an integral number in the range from about 100 to about 2000.

17. An optical fiber at least partly surrounded by a mixture as set forth in claim 10, wherein R and R' are radicals selected from the group consisting of:

—$CH_3$, —$CH_2H_5$, —$CH=CH_2$, —$C_6H_5$ and R" and R''' are radicals selected from the group consisting of:

—$CH=CH_2$, —$CH_2$—$CH=CH_2$.

18. An optical fiber at least partly surrounded by a mixture as set forth in claim 17, wherein the unsaturated silicone is a vinyl-terminated polydimethylsiloxane having the formula:

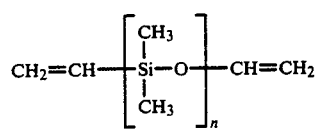

19. An optical fiber at least partly surrounded by a mixture as set forth in claim 17, wherein the unsaturated silicone is a polydimethylsiloxane terminated with vinyl unsaturations in the chain having the formula:

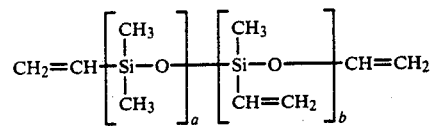

20. An optical fiber cable comprising at least one optical fiber within a protective layer and at least partly surrounding said optical fiber, a mixture of:
 (a) at least one unsaturated silicone having unsaturated groups in quantities larger than 0.2 millimoles per 100 g. of said silicone and having the formula:

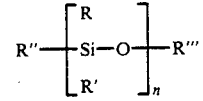

where R and R' are from the group consisting of saturated aliphatic radicals, unsaturated aliphatic radicals and aromatic radicals, R" and R''' are unsaturated aliphatic radicals and n is an integral number; and
 (b) at least one transition metal catalyst selected from group consisting of transition metals, the inorganic and organometallic salts of the transition metals and the organometallic acids of said transition metals.

* * * * *

UNITED STATES PATENT AND TRADEMARK OFFICE
CERTIFICATE OF CORRECTION

PATENT NO. : 4,688,889
DATED : August 25, 1987
INVENTOR(S) : Franco Pasini et al It is certified that error appears in the above-identified patent and that said Letters Patent is hereby corrected as shown below:

Col. 7, line 11, "sapces" should read --spaces;

Col. 8, line 8, "silicon" should read --silicone--;
   line 54, "silicon" should read --silicone--.

Signed and Sealed this

First Day of March, 1988

*Attest:*

DONALD J. QUIGG

*Attesting Officer*       *Commissioner of Patents and Trademarks*